(12) United States Patent
Buisson

(10) Patent No.: US 9,506,619 B2
(45) Date of Patent: Nov. 29, 2016

(54) SIGNALING LAMPS FOR MOTOR VEHICLE

(75) Inventor: Alain Buisson, Trappes (FR)

(73) Assignee: AUTOMOTIVE LIGHTING REAR LAMPS FRANCE S.A.S., Saint-Julien du Sault (FR)

( * ) Notice: Subject to any disclaimer, the term of this patent is extended or adjusted under 35 U.S.C. 154(b) by 521 days.

(21) Appl. No.: 13/813,325

(22) PCT Filed: Jul. 29, 2011

(86) PCT No.: PCT/EP2011/063158
§ 371 (c)(1),
(2), (4) Date: Apr. 2, 2013

(87) PCT Pub. No.: WO2012/013811
PCT Pub. Date: Feb. 2, 2012

(65) Prior Publication Data
US 2013/0182450 A1    Jul. 18, 2013

(30) Foreign Application Priority Data

Jul. 30, 2010 (FR) .................................. 10/03197
Jul. 27, 2011 (FR) .................................. 11/02342

(51) Int. Cl.
| | |
|---|---|
| *F21V 9/00* | (2015.01) |
| *F21S 8/10* | (2006.01) |
| *B60J 5/10* | (2006.01) |
| *B60Q 1/00* | (2006.01) |
| *B60Q 1/26* | (2006.01) |
| *F21V 8/00* | (2006.01) |

(52) U.S. Cl.
CPC .............. *F21S 48/20* (2013.01); *B60J 5/107* (2013.01); *B60Q 1/0035* (2013.01);
(Continued)

(58) Field of Classification Search
CPC .. B60Q 3/002; B60Q 1/0041; B60Q 1/0011; B60Q 1/268; B60Q 1/0058; B60Q 3/042; B60Q 3/044
USPC .................................................. 362/459–549
See application file for complete search history.

(56) References Cited

U.S. PATENT DOCUMENTS

| | | |
|---|---|---|
| 4,420,797 A | 12/1983 | Tohata |
| 8,939,622 B2 | 1/2015 | Buisson |

(Continued)

FOREIGN PATENT DOCUMENTS

| | | |
|---|---|---|
| DE | 19825281 A1 | 12/1999 |
| DE | 102005035063 A1 | 2/2007 |

(Continued)

OTHER PUBLICATIONS

Jul. 29, 2011 International Search Report and Written Opinion (PCT/EP2011/063158).

*Primary Examiner* — William Carter
(74) *Attorney, Agent, or Firm* — Howard & Howard Attorneys PLLC

(57) ABSTRACT

An optical device is incorporated into an external part of a motor vehicle and comprises at least one sub-assembly including a light curtain or light curtain plus light guide and, on either side thereof, transparent plates each of which has at least one part being transparent and at least one other part being semi-transparent. At least one light source is connected to an electric source and emits rays of light that spread in a thickness of the light curtain or light curtain plus light guide. The sub-assembly and light source are incorporated into a housing, and the optical device collaborates with at least one lamp incorporated into a body-shell of the vehicle or LED on a suitable plate included in a sub-housing incorporated into the housing and emits rays of light through at least a portion of the light curtain or light curtain plus light guide that is transparent.

1 Claim, 4 Drawing Sheets

(52) U.S. Cl.
CPC ......... *B60Q 1/0041* (2013.01); *B60Q 1/2607* (2013.01); *B60Q 1/2661* (2013.01); *F21S 48/215* (2013.01); *F21S 48/225* (2013.01); *F21S 48/2243* (2013.01); *F21S 48/2268* (2013.01); *F21S 48/2281* (2013.01); *G02B 6/0055* (2013.01); *G02B 6/006* (2013.01); *G02B 6/0035* (2013.01)

(56) References Cited

U.S. PATENT DOCUMENTS

| | | |
|---|---|---|
| 2003/0128549 A1 | 7/2003 | Matsuura et al. |
| 2004/0136203 A1* | 7/2004 | Gasquet .................... 362/543 |
| 2009/0141512 A1* | 6/2009 | Eberwein .................. 362/497 |

FOREIGN PATENT DOCUMENTS

| | | |
|---|---|---|
| EP | 0256399 A1 | 2/1988 |
| EP | 0453092 A1 | 10/1991 |
| EP | 1031462 A2 | 8/2000 |
| FR | 2859443 A1 | 3/2005 |
| FR | 2868506 A1 | 10/2005 |
| FR | 2933665 A1 | 1/2010 |
| FR | 2953781 A1 | 6/2011 |
| JP | 4254234 | 9/1992 |
| JP | 2003-237463 A | 8/2003 |
| JP | 2008-147032 A | 6/2008 |
| WO | 2007077099 A1 | 7/2007 |
| WO | 2011/070161 A1 | 6/2011 |

* cited by examiner

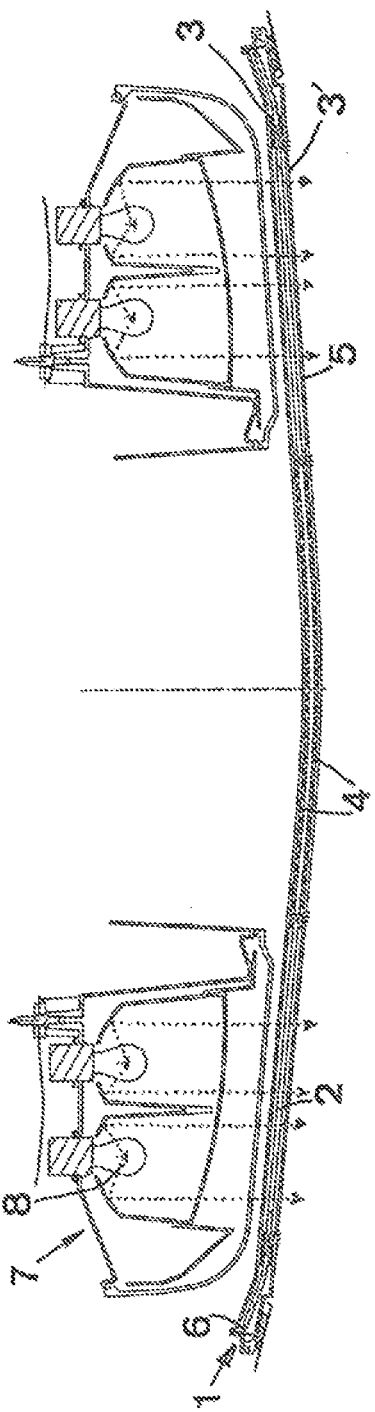
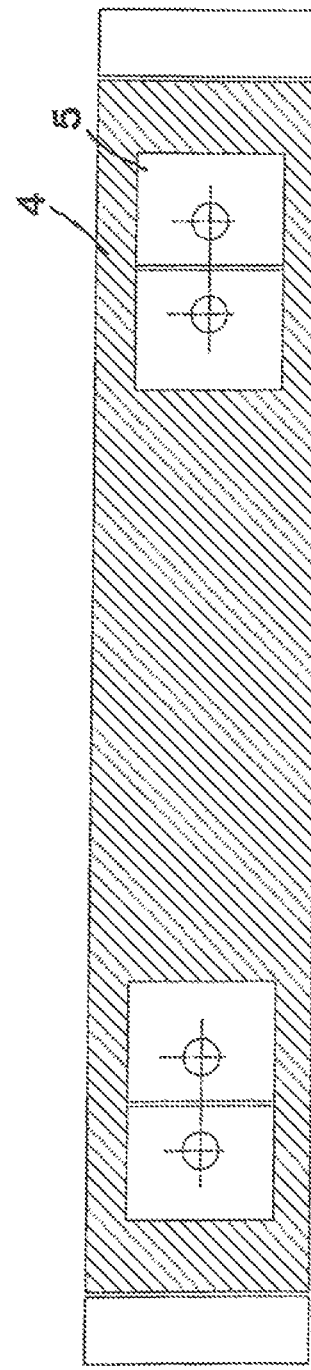
Fig. 2
Fig. 3

SIGNALING LAMPS FOR MOTOR VEHICLE

CROSS-REFERENCE TO RELATED APPLICATIONS

This application is a "national phase" application based upon. International Patent Application PCT/EP2011/063158 filed on Jul. 29, 2011, which, in turn, claims priority to French Patent Application 10/03197 filed on Jul. 30, 2010 and French Patent Application 11/02342 filed on Jul. 27, 2011.

BACKGROUND OF INVENTION

1. Field of Invention

The invention relates to the field of vehicles (notably, motor vehicles), lighting, and signaling. The invention relates to, more specifically, a device for signaling lights of a motor vehicle that is designed and arranged so that the device can be incorporated into both the door to the luggage compartment or tailgate and into the lower part and/or at least one of the peripheral parts of the windshield of the motor vehicle while advantageously leaving the device itself or a part thereof transparent so that it can be seen through.

2. Description of Related Art

Motor-vehicle signaling lights perform various lighting and signaling functions. They are fixed to the external structure of the vehicle (both at the front and rear thereof) and/or, in part, on the door to the luggage compartment or tailgate of the vehicle.

In practice, several of the front-signaling optical devices are generally fixed underneath or beside the headlamps and even, increasingly often, in a substantially same horizontal plane thereof, but offset toward the rear of the vehicle in substantially almond-shaped housings. These devices take up a not-insignificant amount of space through which the driver of the vehicle has absolutely no visibility.

The lights grouped together in this way are, notably, the turn-signal indicators or flashing lights, fog lights, position lights, parking lights, reversing lights, hazard-warning lights, and daytime-running lights.

In the case of the rear lights, which may also include retro-reflectors, the regulations forbid photometric functions from being sited on the door and luggage-compartment-opening leaves or tailgates unless those functions are present on the fixed parts of the vehicle because the devices sited on the leaves are intended only to take over should the same functions provided on the fixed parts become defective.

The most commonplace solution is, therefore, to transfer all of the rear optical devices of the vehicle away from the door to the luggage compartment, thus necessarily limiting the width thereof. Another solution that has become widespread is to divide the optical units into two (one part remaining on the bodywork of the vehicle while the remaining portion is fixed to the door to the luggage compartment), but this makes these optical units more complicated to fit and to connect-up.

Attempts have also been made at tackling the problem of motor-vehicle-tailgate or -luggage-compartment-door-opening width in other ways.

Thus, EP 1 031 462 proposes locating all of the rear lighting components at the corners of the vehicle such that the lighting components still project the light toward the rear even when the door to the luggage compartment or the tailgate is up.

FR 2 859 443 proposes, to make the bodywork parts of the motor vehicles visible without the need for lighting elements and an electric-power supply, the use of a light-emitting film bonded to the motor-vehicle-bodywork component concerned, possibly with transparent external protection as well.

FR 2 933 665 describes a motor-vehicle rear-luggage-compartment flap provided with at least one cutout to render at least partially visible an optical unit fixed to the structure of the vehicle. As an option, this cutout may correspond to a transparent central part of the optical unit the lighting elements of which may then be light-emitting diodes facing toward the outside and arranged in a ring around an empty central zone. This empty central zone is empty of any lighting component and allows the driver to increase his visibility in this direction (known as "the three-quarters rear visibility"). The technical and industrial constraints generated by such cutouts and the intimate marrying of the optical unit fixed to the structure with the cutout made in the door to the luggage compartment or the tailgate have put the brakes on the development of such a solution, which also finds itself compromised by difficulties in obtaining a perfect seal between the optical unit that has to be visible from the outside and the cutout that has to be at least partially in register therewith.

As far as the signaling lamps situated at the front of motor vehicles are concerned, the current solutions are relatively limited, and all of them are bulky.

SUMMARY OF INVENTION

The invention seeks to afford original motor-vehicle lighting and/or signaling. It, thus, seeks to overcome the various disadvantages of the respective signaling lamp systems of the prior art by providing an optical device incorporated into an external structural part (notably, a door of a luggage compartment or the tailgate) and/or into the front of a motor vehicle. The optical device comprises at least one sub-assembly including a light curtain or light curtain plus light guide and, on either side thereof, transparent plates each of which has at least one part being transparent and at least one other part being semi-transparent. At least one light source is connected to an electric source and emits rays of light that spread in a thickness of the light curtain or light curtain plus light guide. The sub-assembly and light source are incorporated into a housing, and the optical device collaborates with at least one lamp incorporated into a body-shell of the vehicle or LED on a suitable plate included in a sub-housing incorporated into the housing and emits rays of light through at least a portion of the light curtain or light curtain plus light guide that is transparent.

Advantageously, the reflective treatment of the semi-transparent parts of the transparent plates is on that face of the plates that faces toward the light curtain or light curtain plus light guide.

The device according to the invention, thus, uses a transparent optical material and at least one light source of "LED" type [referred to as "LED(A)"] designed to emit rays of light that spread inside the thickness of the transparent optical material—for example, of the type of optical system described in French Patent Application 09/05984 filed on Dec. 1, 2009 and published as FR 2 953 781 (which is incorporated herein by reference).

In this embodiment, the device for a motor-vehicle lamp according to the invention—comprising a transparent optical material and at least one light source of "LED" type designed to emit rays of light that spread inside the thickness of the transparent optical material—comprises also a sheet of such a transparent optical material forming a curtain (the sheet including at least one bilateral elongate bulge of substantially circular or polygonal cross-section and having its mean longitudinal axis in the mean plane of the sheet and able to form a light guide) and at least one LED [LED(A)] positioned at least at one of the ends of the light guide with its main axis orthogonal to the longitudinal axis of the light guide.

The invention is, therefore, a device for motor-vehicle signaling lamps that is designed and arranged so that it can be incorporated into the door to the luggage compartment or the tailgate and/or into an appropriate part of the front external structure of a motor vehicle. The device is as defined hereinabove and in the description that follows.

In the embodiment that employs the solutions from French Patent Application 09/05984, aside from this or these bilateral elongate bulge(s) of substantially circular or polygonal cross-section, the element made of optically transparent material, in practice, constitutes a flat or curved sheet. The above-mentioned bulging part forms an integral part of the sheet.

In the description, the term "element" is given to a sheet bearing at least one bulge or rib forming a light guide, and the name "device part" is the name given to the assembly of element plus light-emitting diodes, together with their respective connections to a power source and any accessories they might have. The above-mentioned bulges are given the name "cylindrical zones" or "substantially cylindrical zones."

In one embodiment, the element made of transparent optical material is, thus, a flat or curved sheet (and, in the case of curved, the angle of curvature may vary from one end of the sheet to the other). The bulging zone or zones pass(es) right across it along a longitudinal axis substantially parallel to the mean plane of the sheet. In the event that there are a plurality of such substantially cylindrical zones, in an embodiment, these zones are made parallel to one another. The light guides formed by these bulges may be linear, curved in two dimensions, or even curved once or more in all three dimensions.

According to an embodiment of this light-curtain or light-curtain-plus-light-guide system, the above-mentioned device comprises an element having at least one substantially cylindrical zone the cross-section of which has a diameter substantially greater than the mean thickness of the sheet in the extreme zone or zones. This, then, yields optimized diffusion of light, substantially uniformly, by total reflection in all or substantially all of the element. This element may be made of glass or, in an embodiment, plastic [notably, polymethylmethacrylate (PMMA) or polycarbonate (PC)]. It may include inclusions or conventional forms of irregularities positioned purposely within the element whereas the light guide, in an embodiment, includes prisms of pre-defined angle and structure to meet the requirements of the regulations in this area, which are known to those skilled in the art.

Such an element may be obtained by injection molding using a conventional technique in a thickness that is standard for this type of product (in an embodiment, around 3 to 4 mm in the case of the sheet and a diameter of around 7 to 10 mm for the cylindrical zone that acts as a light guide). For practical reasons connected with the needs to mold/demold without a backdraft, the line along which the bulge meets the sheet, in an embodiment, has a cut (for example, measuring around 1.5 mm wide by 2.2 mm thick).

On the basis of the prior art, the person skilled in the art is able to select the positioning for the LEDs [LED(A)] on or near the cylindrical zones of transparent optical material. In practice, the LEDs [LED(A)] are located on or near a peripheral edge of the element in line with an above-mentioned substantially cylindrical zone.

Without wishing to be bound by any particular theory, it is believed that the cylindrical zones act within the material of the element according to the invention like light guides that diffuse practically all of the light emitted by the relevant source across the entire length of the cylindrical (or, as an alternative, elongate polygonal) bulge and, from there, over substantially all the surface of the element bordering or surrounding the above-mentioned substantially cylindrical zones.

The element recommended as an option may, therefore, be provided with conventional inclusions and/or cavities producing focal points for the diffusion of light and allowing this light to be diffused either directly to the outside or indirectly by reflection off a reflective face of an element positioned on the inside of the device (in an optical assembly for a vehicle).

As an option, the light guide of the relevant element is provided with conventional inclusions designed to allow the light rays coming from the light source to be deflected into the planar or curved sheet parts or wings that extend near the relevant light guide or into those parts of the element that are situated between two such light guides.

Decorative dots or lines may optionally be included within the sheet. For reasons of uniformity, these are, in an embodiment, placed in a "staggered" configuration.

The conventional cones introduced into the guides by known means are, in an embodiment, still normal to the surface and without backdraft.

As an option, the light guides may also include reflective elements and/or decorative elements that, by projecting onto the neighboring portions of the device according to the invention, trace in a virtual manner onto the planar or curved surfaces thereof a suitable shape.

Prisms or other local-discontinuity-inducing elements (such as those described in French Patent Publication 2 868 506) may advantageously be included on the sheet to allow the latter to perform the regulations-stipulated function for a motor-vehicle lamp. In the case of a front lamp, the device is fitted with a white-light source.

In practice, by replacing the dots included in the sheet with continuous broken (or other form of) lines, it is possible to create varying patterns that the lighting of the device reveals with a particularly noteworthy "relief" effect.

At the opposite end of the light guide from the one that is fitted with at least one LED [LED(A)], it is possible to provide either a cover to conceal from view any light escaping from the sheet around its periphery or a reflection element (in an embodiment, metallic) or even chamfers and/or prisms.

The device according to the invention may have optional or alternative features that can be considered separately or in combination, such as:

The light curtain or light curtain plus light guide is of the type described in French Patent Application 09/05984;

The external periphery of the device includes a shoulder emphasizing the outline of the light;

Suitable components and elements that are also suitably arranged around at least part of the periphery of the device to form a housing and afford sealing against fluids (liquids and/or air);

The glass protecting the device may consist of the external face of the device according to the invention itself;

The light is compact, and none of the lighting functions is duplicated (except for the lamp function);

The traditional interior light situated on the body-shell of the vehicle as an option performs the functions of lamp, stoplight, reversing light, and fog light with advantageously one type of light-emitting diode per function;

A traditional seal (for example, of the "snap on" type) surrounds the device fixed to the door to the luggage compartment or tailgate and, thus, seals it;

The light or lights traditionally incorporated into the body-shell of the vehicle is/are in a similar directional arrangement, but included in the housing of the optical device for front signaling lights and have LEDs [LED(B)] as their light source;

The LEDs [LED(B)] advantageously incorporated into a sub-housing and intended to emit rays of light through at least part of those portions of the light curtain or light curtain plus light guide left transparent are fixed to a plate or forward thereof. Advantageously, the integrated circuits are re-located to another board distant from the aforementioned plate to encourage ventilation and, therefore, cooling of the rear face of the LEDs [LED(B)] and avoid the integrated circuits becoming degraded through overheating:

The device comprises the light curtain or light curtain plus light guide between two walls that are respective transparent plates rendered, in certain suitably chosen zones, transparent or semi-transparent in the case of the outer plate and transparent, semi-transparent, or mirror-finish in the case of the inner plate. The latter has an unsilvered zone so that the lamp situated behind it is visible, this zone can be illuminated, and/or the LEDs [LED(B)] situated behind can be seen while the lighting beam of the lamp and/or of the LEDs [LED(B)] is substantially perpendicular to the curtain;

The LEDs [LED(B)] are fixed to a plate itself incorporated into the sub-housing whereas natural or forced rear ventilation of the plate is provided; and The optical devices designed can, as is known by those skilled in the art and with suitable adaptation if necessary, be mounted on either the door to the luggage compartment or tailgate, on the body-shell below the windshield or in the bottom part thereof, on or near the windscreen pillars, or even toward the top of the windshield, depending on the particular lights that are being grouped together in this way and/or the stylistic effects that the person skilled in the art is seeking to achieve.

The invention is better understood and further objects, advantages, and features thereof become more clearly apparent in light of the following detailed description of some embodiments of the device according to the invention. The embodiments are given purely by way of non-limiting illustration, and figures of a drawing of the invention are attached to the description.

BRIEF DESCRIPTION OF EACH FIGURE OF DRAWING OF INVENTION

FIG. 2 depicts a schematic view of FIG. 1 extended to both (left and right) optical units incorporated into a luggage-compartment door or tailgate.

FIG. 3 depicts a schematic "face on" view of a transparent plate for the device according to FIG. 1 including one zone rendered semi-transparent and at least one zone left transparent.

DETAILED DESCRIPTION OF EMBODIMENTS OF INVENTION

Figure 1:
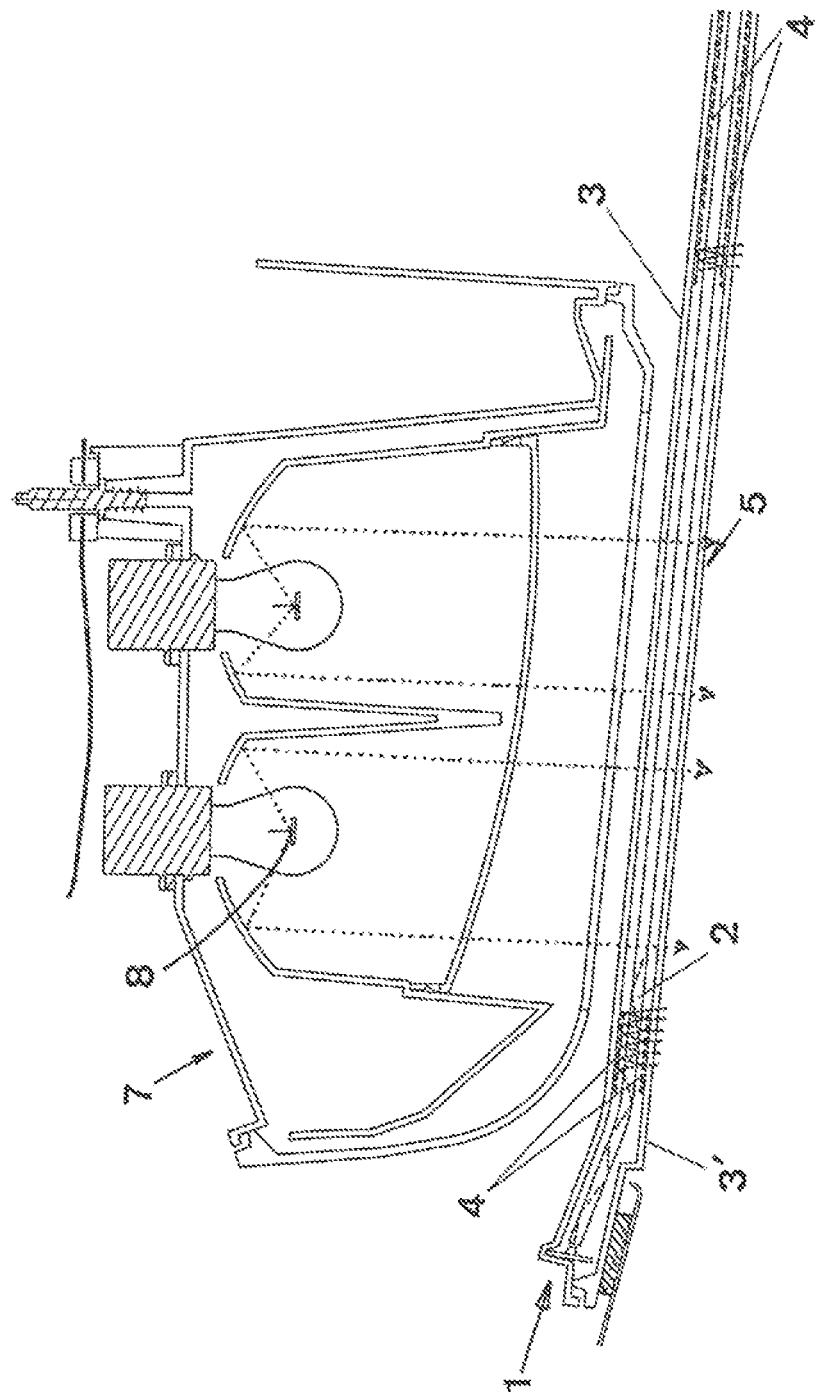
FIG. 1 depicts one embodiment of a device according to the invention in horizontal partial schematic cross-section restricted to the left-hand side of a luggage-compartment door.

In these figures, identical numerals denote elements that are similar or equivalent.

With reference to the drawing, the device 1 according to the invention comprises a light curtain or light curtain plus light guide 2 and, parallel to the two main faces of the element 2, two transparent plates 3, 3' each having a treatment rendering it semi-transparent over one or more portion(s) 4 of its surface.

The portions of the elements 3, 3' that are not semi-transparent are transparent zones 5 through which the beams of light emitted substantially perpendicularly by the LEDs [LED(B)]—for example, for respectively a brake light 10, flashing turn-indicator light 11, fog light 12 (on the left), and reversing light 13 (on the right) from the top downward—can be seen.

The light guide or light curtain plus light guide advantageously includes inclusions 6.

The optical assembly with which the motor vehicle incorporating the device according to the invention is fitted comprises, in an embodiment (see FIGS. 1-3), an optical unit 7 including a body-shell light, which is fixed. This may conventionally include at least one light bulb 8 of suitable power, possibly in the form of one or more light-emitting diode(s).

Such a device, in operation, affords a "viewing window" effect, allowing a significant increase in visibility in the rear-view mirror (notably, for what is commonly known as "three-quarters rear visibility").

In practice, the device according to the invention may afford an up-to-fifty-centimeter increase in the width of opening for the door to the luggage compartment or the tailgate of a motor vehicle so equipped.

Figure 4:
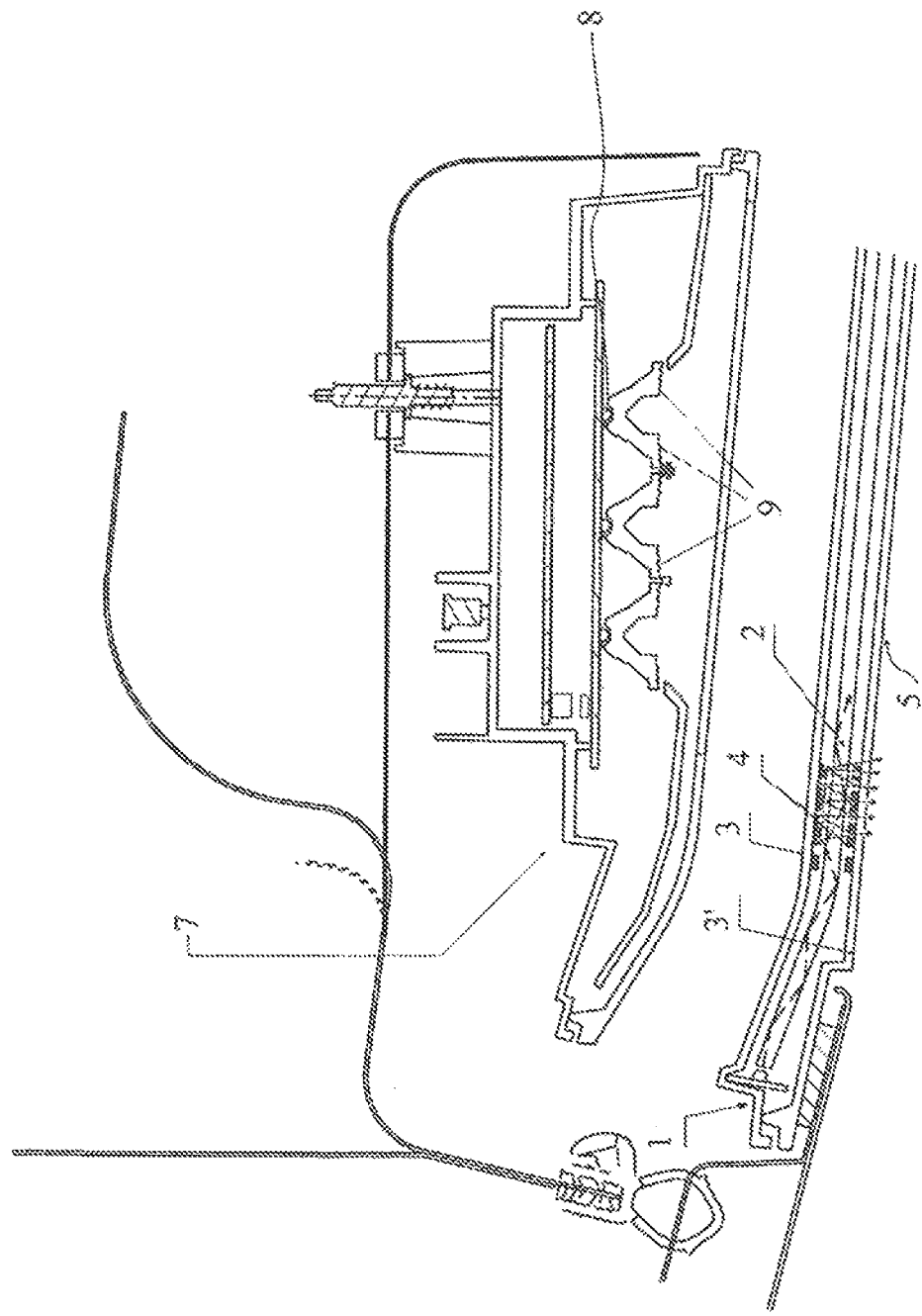
FIG. 4 depicts another embodiment of a device according to the invention in horizontal partial schematic cross-section restricted to the left-hand side of a luggage-compartment door.
Figure 5:
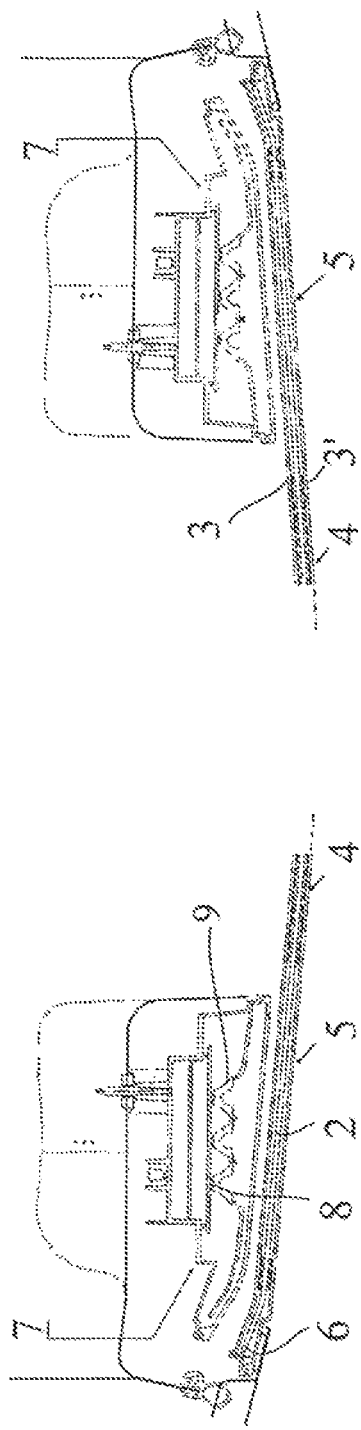
FIG. 5 depicts a schematic view of FIG. 4 extended to both (left and right) optical units incorporated into a luggage-compartment door or tailgate or that can be incorporated into a front external structural part of a vehicle.
Figure 6:
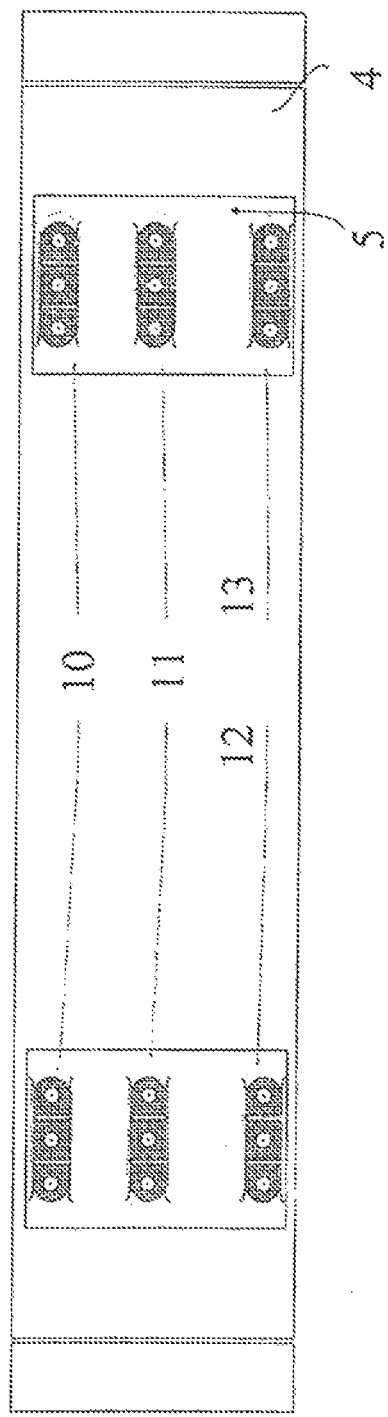
FIG. 6 depicts a schematic "face on" view of a transparent plate for the device according to FIG. 4 including a zone rendered semi-transparent and at least one zone left transparent.

In a second embodiment (see FIGS. 4-6), the optical assembly with which the motor vehicle incorporating the device according to the invention is fitted is a modular optical device also comprising an optical unit 7 including a light having LEDs [LED(B)] 8 incorporated into a sub-housing according to the invention with conventional optical components 9 and having suitable power chosen appropriately. Such a device affords a "viewing window" effect and allows it to be seen through. Positioning it at the front of a vehicle appears to be entirely suitable on electric motor vehicles powered by motors located on the wheel shafts and that, thus, have no engine compartment across the front.

The invention has been described above in an illustrative manner. It is to be understood that the terminology that has been used above is intended to be in the nature of words of description rather than of limitation. Many modifications and variations of the invention are possible in light of the above teachings. Therefore, within the scope of the

What is claimed is:

1. The optical device incorporated into an external part of a motor vehicle the optical device comprising:
   - at least one sub-assembly including either of a light curtain and a light curtain plus light guide and, on either side thereof, a plurality of substantially transparent plates each of which has at least one part being substantially transparent and at least one other part being semi-transparent;
   - at least one light source that is connected to an electric source and emits rays of light that spread in a thickness of either of the light curtain and the light curtain plus light guide, wherein the sub-assembly and light source are incorporated into a housing and the optical device collaborates with at least one either of a lamp incorporated into a body-shell of the motor vehicle and an LED on a suitable plate included in a sub-housing that is incorporated into the housing and emits rays of light through at least a portion of either of the light curtain and the light curtain plus light guide that is substantially transparent; and
   wherein either of the light curtain is and the light curtain plus light guide are disposed between two walls that are the respective transparent plates being, in certain chosen zones, either of substantially transparent and semi-transparent in a case of an outer plate and any of substantially transparent, semi-transparent, and mirror-finish in the case of an inner plate, which has an unsilvered zone so that the lamp situated behind the inner plate in a luggage compartment is visible and the zone is illuminated.

* * * * *